W. SCHIEK.
SPRING WHEEL.
APPLICATION FILED JULY 25, 1910.
994,539.
Patented June 6, 1911.
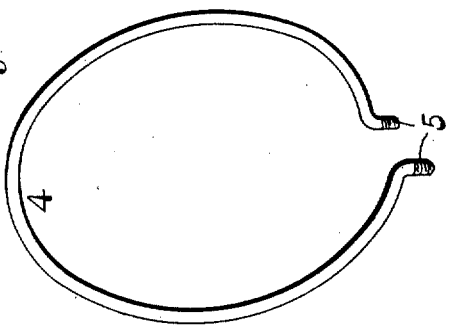
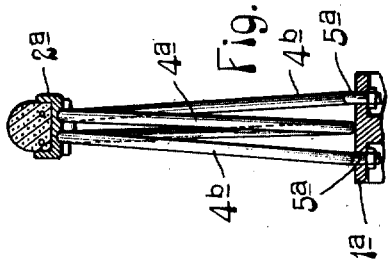
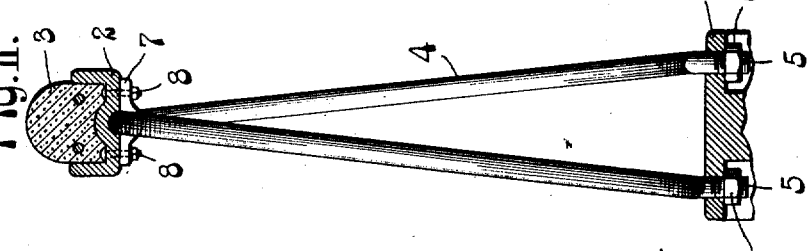
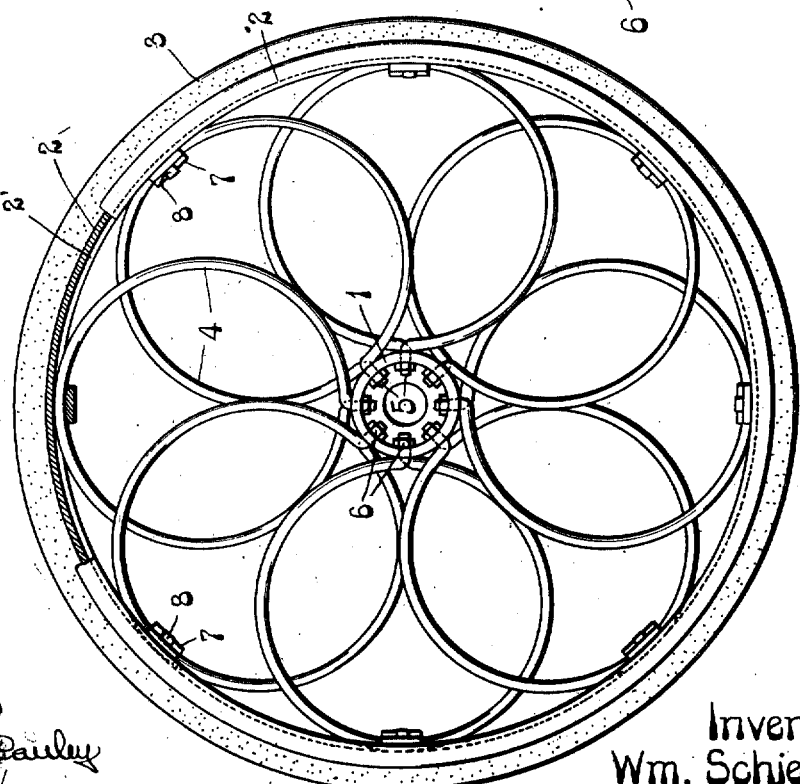
Attest
A. J. McCauley
M. C. Hammon
Inventor:
Wm. Schiek
by E. S. Knight Att'y.

UNITED STATES PATENT OFFICE.

WILLIAM SCHIEK, OF FREEBURG, ILLINOIS.

SPRING-WHEEL.

994,539.　　　　Specification of Letters Patent.　　Patented June 6, 1911.

Application filed July 25, 1910.　Serial No. 573,603.

*To all whom it may concern:*

Be it known that I, WILLIAM SCHIEK, a citizen of the United States of America, residing in Freeburg, in the county of St. Clair and State of Illinois, have invented certain new and useful Improvements in Spring-Wheels, of which the following is a full, clear, and exact description, reference being had to the accompanying drawings, forming part of this specification.

My invention relates to a spring wheel more particularly intended for use upon road vehicles, and it has for its object the production of a wheel of this description that is of simple construction, and one that is of such resilient nature as to dispense with the employment of cushion tires such as are at present greatly in vogue, and which are very expensive both in cost of production and in maintenance in serviceable condition.

Figure I is a side elevation of my spring wheel with a portion of the wheel shown in section. Fig. II is a cross section through the rim and tire and a portion of the hub of my wheel with one of the spring rings in elevation. Fig. III is a perspective view of one of the spring rings. Fig. IV is a view similar to Fig. II, illustrating a modified form of spring ring.

1 designates the hub of my wheel, 2 the felly or rim concentric with the hub, and 3 a tire fitted to the felly or rim.

4 designates spring rings interposed between the hub and felly, and preferably so arranged that they overlap each other, as seen in Fig. I. Each of these spring rings is circular in shape, and the rings terminate in substantially radial arms 5 extending at angles to such bodies, as illustrated in the drawing. It should also be noted at this point that the end portions of the rings are offset from each other, as seen most clearly in Fig. II, so that what I will term the arms of the rings are arranged obliquely relative to the arches or outer bows of the rings. Further, that the arms 5 of the rings are so disposed that when they are connected to the hub of the wheel, the arms of each ring will occupy positions in a line longitudinally of said hub.

The hub is provided with longitudinal alining perforations through which the arms of the rings extend, and these arms are secured to the hub preferably by the employment of nuts 6 applied to the arms interior of the hub, although it is obvious that other means for fastening the arms to the hub might be made use of in lieu of said nuts.

The felly or rim 2 of my wheel is provided at its inner face with a groove 2' in which the bows or arches of the spring rings 4 are seated, and this groove is preferably made of a depth at least equal to one-half of the cross section of one of the spring rings, in order that the bows of the rings may be more stably held in said groove. The bows of the rings are maintained in their seats provided by the groove 2' through the medium of clip plates 7, grooved to register with the grooves in the felly or rim, so that they, with the felly, will serve to embrace the bows of the rings and hold them from movement. The clip plates are secured to the felly or rim by bolts 8.

It will be seen from the foregoing that the spring rings 4 are so mounted between the hub and the felly or rim of my wheel and the ends of these rings are so attached to the hub of the wheel, as to provide cylindrical shaped springs from which a high degree of resiliency or elasticity may be derived as compared with spring rings of other description, and furthermore, that these spring rings are much less liable to breakage when subjected to strain than any spring ring in which there are angular portions in the yielding parts of the rings, it being obvious that such angular portions will, under strain, break much more quickly than a curved portion in the same position.

In Fig. IV, I have shown a modification in which instead of using single coil rings, I use rings composed of two coils, the ring here shown comprising a central coil 4ª, the bow of which rests against the hub 1ª and is fitted to the felly or rim 2ª while the outer coil is completed in conjunction with the central coil, due to the continuation of the ring by the portions 4ᵇ that carry the arms 5ª attached to the hub of the wheel. This modified form of spring is intended to be used more particularly in the wheels of heavy vehicles, but it is obvious that it might be used in the wheels of light vehicles, inasmuch as the resiliency of the spring depends upon the resiliency of the wire that enters into the construction of the spring rings.

I claim:

1. A spring wheel comprising hub and felly elements, spring rings of uniform curvature throughout their compasses, interposed between said hub and felly elements, said rings having end arms offset from each other transversely of the wheel and alined with each other longitudinally of the hub element, the hub element having longitudinally alining perforations for the reception of said arms, and means for securing said arms to the hub.

2. A spring wheel comprising hub and felly elements, double coil spring rings of uniform curvature throughout their compasses interposed between said hub and felly elements, each of said rings having end arms offset from each other transversely of the wheel and alined with each other longitudinally of the hub element, the hub element having longitudinally alining perforations for the reception of said arms, and one coil of each of said spring rings bearing against said hub element at a point between the end arms of the ring.

WILLIAM SCHIEK.

In the presence of—
H. HEILIGENSTEIN,
CHARLES SCHIEK.

Copies of this patent may be obtained for five cents each, by addressing the "Commissioner of Patents, Washington, D. C."